United States Patent [19]

Hong

[11] Patent Number: 5,469,225
[45] Date of Patent: Nov. 21, 1995

[54] APPARATUS AND METHOD FOR ENHANCING TRANSIENT EDGE OF VIDEO SIGNAL

[75] Inventor: Sung H. Hong, Seoul, Rep. of Korea

[73] Assignee: Goldstar Co., Ltd., Seoul, Rep. of Korea

[21] Appl. No.: 101,447

[22] Filed: Aug. 2, 1993

[30] Foreign Application Priority Data

Aug. 3, 1992 [KR] Rep. of Korea .................. 13948/1992

[51] Int. Cl.$^6$ .................................................. H04N 5/21
[52] U.S. Cl. ........................... 348/625; 348/627; 382/266
[58] Field of Search ...................................... 358/166, 167,
358/162, 160, 36, 37, 96, 141; 382/22,
54; 348/606, 607, 625, 626, 627, 628, 629,
630; H04N 5/213, 5/208, 5/14

[56] References Cited

U.S. PATENT DOCUMENTS

| | | | |
|---|---|---|---|
| 4,758,891 | 7/1988 | Hitchcock et al. | 358/166 |
| 4,780,623 | 10/1988 | Yagi | 358/166 |
| 4,918,528 | 4/1990 | Oohashi | 358/166 |
| 5,023,919 | 6/1991 | Wataya | 358/167 |
| 5,146,319 | 9/1992 | Engel et al. | 358/166 |
| 5,237,625 | 8/1993 | Yamashita et al. | 358/166 |

*Primary Examiner*—James J. Groody
*Assistant Examiner*—Michael H. Lee
*Attorney, Agent, or Firm*—Fliesler, Dubb, Meyer & Lovejoy

[57] ABSTRACT

An apparatus and a method for enhancing a transient edge of a video signal. The enhancement apparatus comprises a transient edge detecting circuit for first degree-differentiating the video signal inputted therein, comparing an absolute value of the first degree-differentiated video signal with a reference value and detecting the transient edge of the video signal in accordance with the compared result, a transient edge dividing circuit for second degree and third degree-differentiating the absolute value of the first degree-differentiated video signal and outputting the resultant transient edge divide signal, a transient edge interpolating circuit for interpolating a value which is obtained by weighting and averaging start and end pixel values of the transient edge based on a transient edge detection signal from the transient edge detecting circuit into the transient edge of the inputted video signal in an interpolation interval and for replacing start and end pixel values of the transient edge of the inputted video signal with the start and end pixel values of the transient edge based on the transient edge detection signal in a replacement interval, and a mixing circuit for outputting the inputted video signal in a non-transient edge interval and the interpolated or replaced video signal in a transient edge interval.

24 Claims, 11 Drawing Sheets

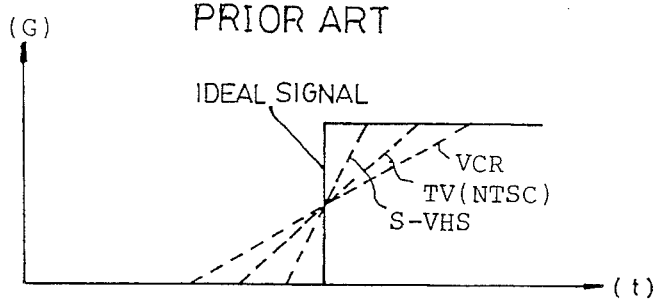
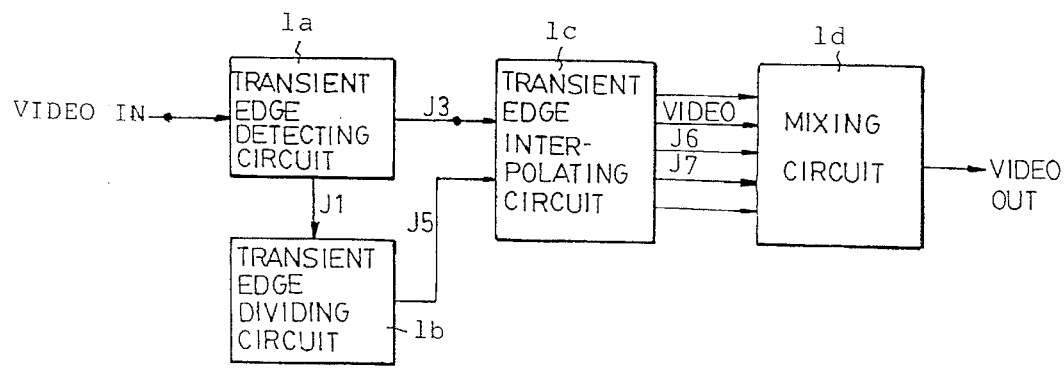
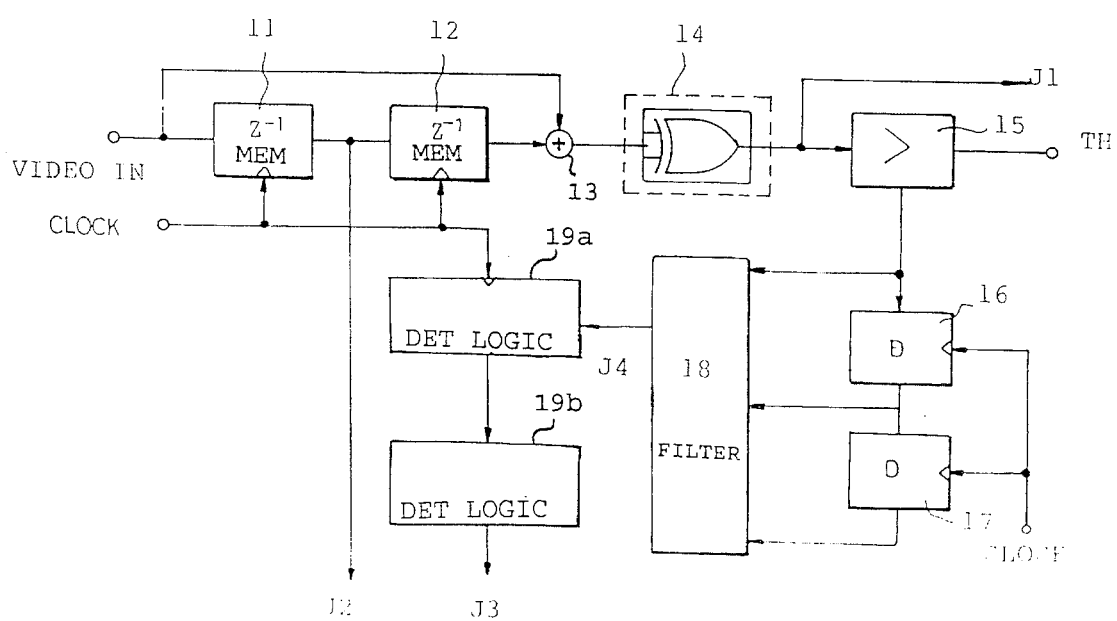

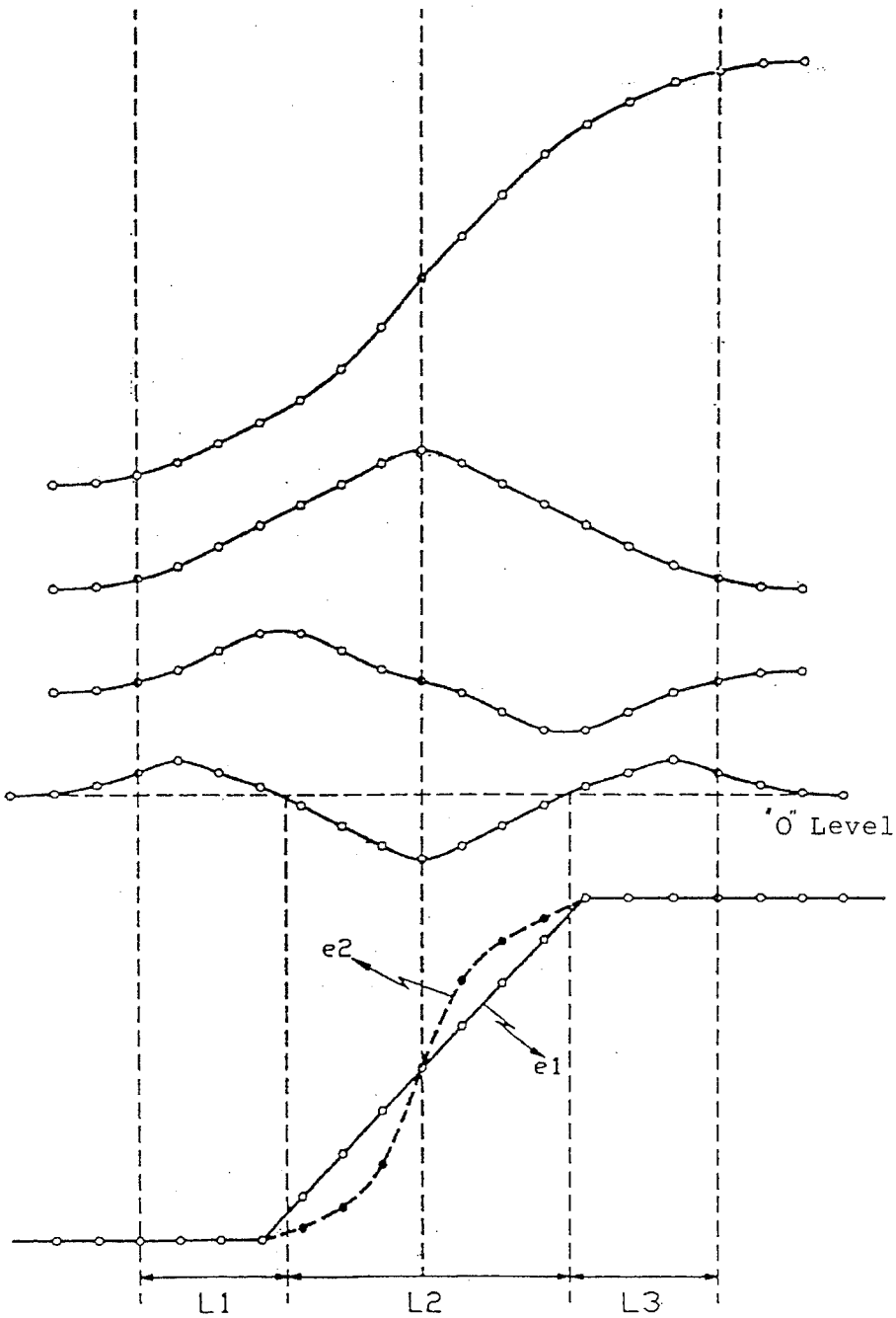

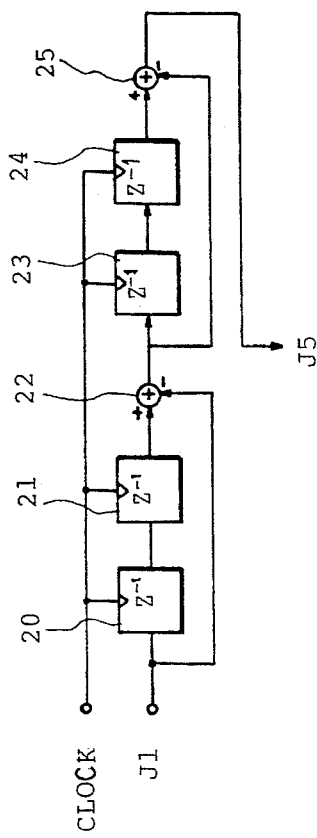
FIG 8
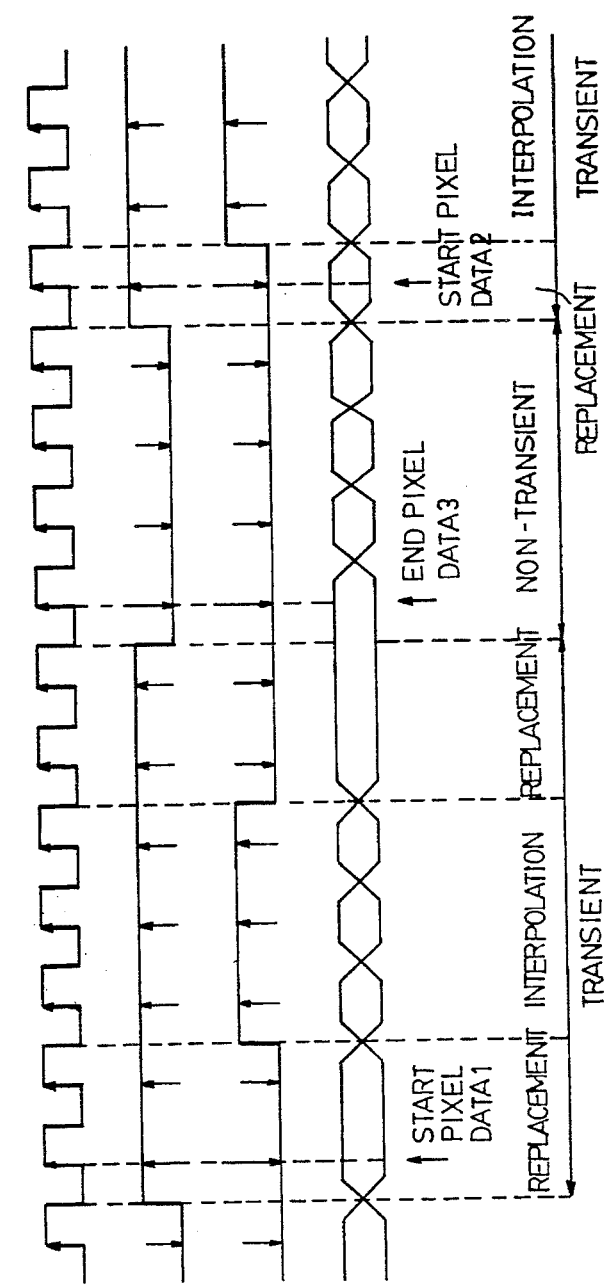
FIG 9A
FIG 9B
FIG 9C
FIG 9D

FIG.14A

ROM1

ADDL

| ADDR | 0 | 1 | 2 | 3 | 4 | 5 | 6 | 7 |
|---|---|---|---|---|---|---|---|---|
| 1 | $\frac{1}{2}$ | 0 | 0 | 0 | 0 | 0 | 0 | 0 |
| 2 | $\frac{2}{3}$ | $\frac{1}{3}$ | 0 | 0 | 0 | 0 | 0 | 0 |
| 3 | $\frac{3}{4}$ | $\frac{2}{4}$ | $\frac{1}{4}$ | 0 | 0 | 0 | 0 | 0 |
| 4 | $\frac{4}{5}$ | $\frac{3}{5}$ | $\frac{2}{5}$ | $\frac{1}{5}$ | 0 | 0 | 0 | 0 |
| 5 | $\frac{5}{6}$ | $\frac{4}{6}$ | $\frac{3}{6}$ | $\frac{2}{6}$ | $\frac{1}{6}$ | 0 | 0 | 0 |
| 6 | $\frac{6}{7}$ | $\frac{5}{7}$ | $\frac{4}{7}$ | $\frac{3}{7}$ | $\frac{2}{7}$ | $\frac{1}{7}$ | 0 | 0 |
| 7 | $\frac{7}{8}$ | $\frac{6}{8}$ | $\frac{5}{8}$ | $\frac{4}{8}$ | $\frac{3}{8}$ | $\frac{2}{8}$ | $\frac{1}{8}$ | 0 |

ADDH

ROM2

ADDL

| ADDR | 0 | 1 | 2 | 3 | 4 | 5 | 6 | 7 |
|---|---|---|---|---|---|---|---|---|
| 1 | $\frac{1}{2}$ | 0 | 0 | 0 | 0 | 0 | 0 | 0 |
| 2 | $\frac{1}{3}$ | $\frac{2}{3}$ | 0 | 0 | 0 | 0 | 0 | 0 |
| 3 | $\frac{1}{4}$ | $\frac{2}{4}$ | $\frac{3}{4}$ | 0 | 0 | 0 | 0 | 0 |
| 4 | $\frac{1}{5}$ | $\frac{2}{5}$ | $\frac{3}{5}$ | $\frac{4}{5}$ | 0 | 0 | 0 | 0 |
| 5 | $\frac{1}{6}$ | $\frac{2}{6}$ | $\frac{3}{6}$ | $\frac{4}{6}$ | $\frac{5}{6}$ | 0 | 0 | 0 |
| 6 | $\frac{1}{7}$ | $\frac{2}{7}$ | $\frac{3}{7}$ | $\frac{4}{7}$ | $\frac{5}{7}$ | $\frac{6}{7}$ | 0 | 0 |
| 7 | $\frac{1}{8}$ | $\frac{2}{8}$ | $\frac{3}{8}$ | $\frac{4}{8}$ | $\frac{5}{8}$ | $\frac{6}{88}$ | $\frac{7}{8}$ | 0 |

ADDH

FIG.14 B

ROM1

ADDL

| ADDR | 0 | 1 | 2 | 3 | 4 | 5 | 6 | 7 |
|---|---|---|---|---|---|---|---|---|
| 1 | $\frac{1}{2}$ | 0 | 0 | 0 | 0 | 0 | 0 | 0 |
| 2 | $\frac{5}{6}$ | $\frac{1}{6}$ | 0 | 0 | 0 | 0 | 0 | 0 |
| 3 | $\frac{7}{8}$ | $\frac{4}{8}$ | $\frac{1}{8}$ | 0 | 0 | 0 | 0 | 0 |
| 4 | $\frac{9}{10}$ | $\frac{7}{10}$ | $\frac{3}{10}$ | $\frac{1}{10}$ | 0 | 0 | 0 | 0 |
| 5 | $\frac{11}{12}$ | $\frac{9}{12}$ | $\frac{6}{12}$ | $\frac{3}{12}$ | $\frac{1}{12}$ | 0 | 0 | 0 |
| 6 | $\frac{13}{14}$ | $\frac{11}{14}$ | $\frac{9}{14}$ | $\frac{5}{14}$ | $\frac{3}{14}$ | $\frac{1}{14}$ | 0 | 0 |
| 7 | $\frac{15}{16}$ | $\frac{13}{16}$ | $\frac{11}{16}$ | $\frac{8}{16}$ | $\frac{5}{16}$ | $\frac{3}{16}$ | $\frac{1}{16}$ | 0 |

ADDH (labels the rows)

ROM2

ADDL

| ADDR | 0 | 1 | 2 | 3 | 4 | 5 | 6 | 7 |
|---|---|---|---|---|---|---|---|---|
| 1 | $\frac{1}{2}$ | 0 | 0 | 0 | 0 | 0 | 0 | 0 |
| 2 | $\frac{1}{6}$ | $\frac{5}{6}$ | 0 | 0 | 0 | 0 | 0 | 0 |
| 3 | $\frac{1}{8}$ | $\frac{4}{8}$ | $\frac{7}{8}$ | 0 | 0 | 0 | 0 | 0 |
| 4 | $\frac{1}{10}$ | $\frac{3}{10}$ | $\frac{7}{10}$ | $\frac{9}{10}$ | 0 | 0 | 0 | 0 |
| 5 | $\frac{1}{12}$ | $\frac{3}{12}$ | $\frac{6}{12}$ | $\frac{9}{12}$ | $\frac{11}{12}$ | 0 | 0 | 0 |
| 6 | $\frac{1}{14}$ | $\frac{3}{14}$ | $\frac{5}{14}$ | $\frac{9}{14}$ | $\frac{11}{14}$ | $\frac{13}{14}$ | 0 | 0 |
| 7 | $\frac{1}{16}$ | $\frac{3}{16}$ | $\frac{5}{16}$ | $\frac{8}{16}$ | $\frac{11}{16}$ | $\frac{13}{16}$ | $\frac{15}{16}$ | 0 |

ADDH (labels the rows)

APPARATUS AND METHOD FOR ENHANCING TRANSIENT EDGE OF VIDEO SIGNAL

BACKGROUND OF THE INVENTION

1. Field of the Invention

The present invention relates in general to video signal processing systems, and more particularly to an apparatus and a method for enhancing a transient edge of a video signal, in which a distinct picture of high quality can be obtained.

2. Description of the Prior Art

Conventionally, to obtain a distinct picture, there has been proposed an apparatus for enhancing a transient edge of a luminance signal or a color signal separated from a video signal. More particularly, the conventional enhancement apparatus is adapted to allow the user to visually feel the distinct picture, by dropping an overshoot and an undershoot of the edge as represented in FIG. 1. One example of this form of apparatus is shown in a block form in FIG. 2, herein.

As shown in FIG. 2, the conventional apparatus for enhancing the transient edge of the video signal comprises delays 1 and 2 for sequentially delaying the video signal inputted therein, amplifiers 3–5 for amplifying the original video signal and the video signals delayed by the delays 1 and 2, respectively, an adder 6 for adding output signals from the amplifiers 3–5, an attenuator 7 for adjusting an enhancement level of an output signal from the adder 6, a delay matching unit 8 for matching an output signal from the attenuator 7 with the output signal from the delay 1, and an adder 9 for adding an output signal from the delay matching unit 8 to the output signal from the attenuator 7 and outputting the resultant enhanced video signal.

The operation of the conventional enhancement apparatus with the above-mentioned construction will hereinafter be described.

Upon inputting the video signal, the amplifier 3 amplifies the inputted video signal and then applies the amplified video signal to the adder 8. Also, the inputted video signal is sequentially delayed by a predetermined time period by the delays 1 and 2. The video signals sequentially delayed by the delays 1 and 2 are amplified by the amplifies 4 and 5, respectively, and then applied to the adder 8.

Noticeably, the inputted video signal is enhanced vertically if the delay time of the delays 1 and 2 is a period of one line, while horizontally if the delay time is a period of one sample. Namely, since the overshoot and undershoot occur at the transient edge of the video signal differentiated by the delays 1 and 2 and the amplifiers 3–5, the edge enhancement is performed.

The enhancement level of the enhanced signal is adjusted by the attenuator 7, which then applies the enhanced signal of the adjusted enhancement level to the adder 9.

On the other hand, the delay matching unit 8 matches the output signal from the attenuator 7 with the output signal from the delay 1 and then applies the matched signal to the adder 9. As a result, the adder 9 adds the output signal from the delay matching unit 8 to the output signal from the attenuator 7 and outputs the resultant enhanced video signal.

For example, in a NTSC broadcasting system, the luminance signal has a band width of 4.2 MHz with its edge portion being 2 to 3.5 MHz. Therefore, the distinct picture is obtained by enhancing the frequency band component of the edge portion using the delays and amplifiers. By the way, various signal processing systems such as a VCR, a NTSC broadcasting television (TV) receiver, a S-VHS and etc. have different natural frequency characteristics of video signals as shown in FIGS. 3 and 4. For this reason, the enhancement on the transient edge must accurately be performed according to the different natural frequency characteristics.

However, the conventional enhancement apparatus has a disadvantage in that the Frequency region to be enhanced is fixed to 2 to 4 MHz. Namely, in the conventional enhancement apparatus, the enhancement on the transient edge is performed on the basis of the NTSC broadcasting TV having the band width of 4 MHz as shown in FIG. 3. For this reason, in the case where the conventional enhancement apparatus is applied to the VCR or S-VHS, a frequency band other than the edge portion is enhanced, resulting in an unnaturalness and a degradation in the picture quality.

In other words, when the enhancement apparatus for the NTSC broadcasting TV is applied to the VCR, a high frequency signal component is enhanced, thereby causing the output video signal to have a considerable amount of noise. Also, in the case where the enhancement apparatus for the NTSC broadcasting TV is applied to the S-VHS, the edge portion is enhanced together with a frequency component lower than that, resulting in the unnaturalness in the output video signal.

As shown in FIG. 4, since the video signals in the NTSC broadcasting TV, the VCR and the S-VHS have the respective limited band widths, the transient edges thereof are of widths increased as compared with an ideal signal and have a frequency difference therebetween.

Also, a relatively large overshoot occurs at a sharp transient edge, thereby causing the video signal to be enhanced together with a noise component. This results in a degradation in the picture quality. Moreover, the video picture is unnatural because only the start point (undershoot) and end point (overshoot) of the transient edge of the video signal are enhanced. Further, the distinct picture cannot be obtained since the width and slope of the transient edge of the video signal are fixed.

SUMMARY OF THE INVENTION

Therefore, the present invention has been made in view of the above problems, and it is an object of the present invention to provide an apparatus and a method for enhancing a transient edge of a video signal, in which the inputted video signals are selectively enhanced according to slopes and widths of the transient edges and frequency bands thereof so that distinct pictures of high quality can be obtained.

In accordance with one aspect of the present invention, there is provided an apparatus for enhancing a transient edge of a video signal, comprising: transient edge detecting means for first degree-differentiating the video signal inputted therein, comparing an absolute value of the first degree-differentiated video signal with a reference value, detecting the transient edge of the video signal in accordance with the compared result and outputting the resultant transient edge detection signal; transient edge dividing means for second degree-differentiating the absolute value of the first degree-differentiated video signal from said transient edge detecting means, third degree-differentiating the second degree-differentiated value and outputting the resultant transient edge divide signal which is divided into interpolation and replacement intervals; transient edge interpolating means for interpolating a value which is obtained by weighting and averaging start and end pixel values of the transient edge based on the transient edge detection signal from said transient edge detecting means into the transient edge of the inputted video signal in the interpolation interval of the transient edge divide signal From said transient edge dividing means and for replacing start and end pixel values of the transient edge of the inputted video signal with the start and end pixel values of the transient edge based on the transient edge detection signal from said transient edge detecting means in the replacement interval of the transient edge divide signal from said transient edge dividing means; and mixing means for outputting the inputted video signal in a non-transient edge interval and the interpolated or replaced video signal From said transient edge interpolating means in a transient edge interval.

In accordance with another aspect of the present invention, there is provided a method of enhancing a transient edge of a video signal, comprising the steps of: (a) First degree-differentiating the video signal inputted therein, detecting an absolute value of the first degree-differentiated video signal and detecting the transient edge of the video signal in accordance with the detected absolute value; (b) second degree-differentiating the absolute value of the first degree-differentiated video signal at the step (a), third degree-differentiating the second degree-differentiated value and dividing the transient edge into interpolation and replacement intervals in accordance with the third degree-differentiated value; (c) outputting the inputted video signal directly in a non-transient edge interval in which the transient edge is not detected at the step (a); (d) replacing start and end pixel values of the transient edge of the inputted video signal with start and end pixel values of the transient edge detected at the step (a) in the replacement interval of the transient edge divided at the step (b); and (e) interpolating a value which is obtained by weighting and averaging the start and end pixel values of the transient edge detected at the step (a) into the transient edge of the inputted video signal in the interpolation interval of the transient edge divided at the step (b).

BRIEF DESCRIPTION OF THE DRAWINGS

The above and other objects, features and advantages of the present invention will be more clearly understood from the following detailed description taken in conjunction with the accompanying drawings, in which:

FIG. 8 is a graph illustrating natural frequency band widths and enhancement frequency bands of video signals in a VCR, a NTSC broadcasting TV and a S-VHS;

FIG. 4 is a graph illustrating the transient edges of the video signals in FIG. 3;

FIG. 5 is a block diagram of an apparatus for enhancing a transient edge of a video signal in accordance with the present invention;

FIGS. 6A to 6E are waveform diagrams of signals in the apparatus in FIG. 5;

FIG. 7 is a functional block diagram of a transient edge detecting circuit in the apparatus in FIG. 5;

FIG. 8 is a functional block diagram of a transient edge dividing circuit in the apparatus in FIG. 5;

FIGS. 9A to 9D are timing diagrams of signals in the transient edge dividing circuit in FIG. 8;

FIGS. 14A and 14B are tables illustrating pixel values stored in ROMs in the transient edge interpolating circuit in FIG. 10.

DETAILED DESCRIPTION OF THE PREFERRED EMBODIMENTS

Figure 1:
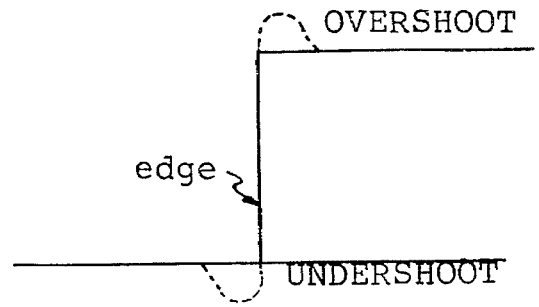
FIG. 1 is a waveform diagram illustrating a human visual characteristic with respect to a transient edge of a general video signal.
Figure 2:
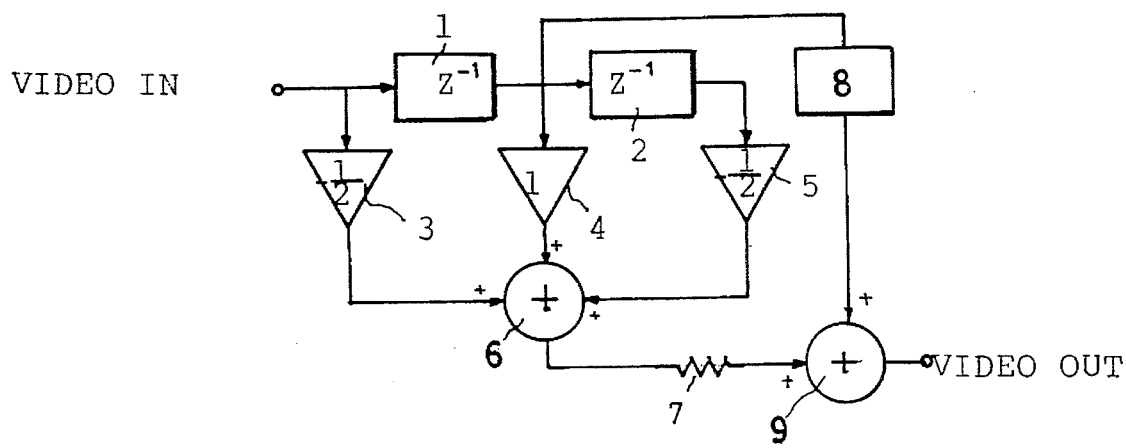
FIG. 2 is a block diagram of a conventional apparatus for enhancing a transient edge of a video signal.
Figure 3:
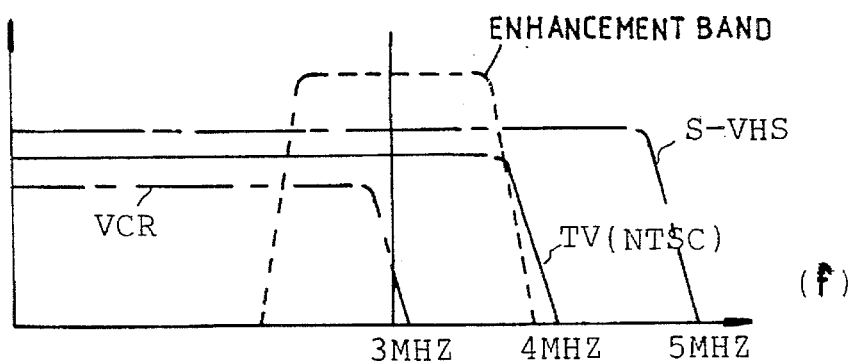

Referring to FIG. 5 there is shown a block diagram of an apparatus for enhancing a transient edge of a video signal in accordance with the present invention. As shown in this drawing, the enhancement apparatus of the present invention comprises a transient edge detecting circuit 1a for first degree-differentiating the video signal inputted therein, comparing an absolute value of the first degree-differentiated video signal with a reference value TH, detecting the transient edge of the video signal in accordance with the compared result and outputting the resultant transient edge detection signal and a transient edge dividing circuit 1b for second degree-differentiating the absolute value of the first degree-differentiated video signal from the transient edge detecting circuit 1a, third degree-differentiating the second degree-differentiated value and outputting the resultant transient edge divide signal which is divided into interpolation and replacement intervals.

A transient edge interpolating circuit 1c is also provided in the enhancement apparatus to interpolate a value which is obtained by weighting and averaging start and end pixel values of the transient edge based on the transient edge detection signal from the transient edge detecting circuit 1a into the transient edge of the inputted video signal in the interpolation interval of the transient edge divide signal from the transient edge dividing circuit 1b and to replace start and end pixel values of the transient edge of the inputted video signal with the start and end pixel values of the transient edge based on the transient edge detection signal from the transient edge detecting circuit 1a in the replacement interval of the transient edge divide signal from the transient edge dividing circuit 1b.

A mixing circuit 1d is adapted to output the inputted video signal in a non-transient edge interval and the interpolated or replaced video signal from the transient edge interpolating circuit 1c in a transient edge interval.

Referring to FIG. 7, there is shown a functional block diagram of the transient edge detecting circuit 1a in the apparatus in FIG. 5. As shown in this drawing, the transient edge detecting circuit 1a includes sample memories 11 and 12 and an adder 13 for cooperating to first degree-differentiate the inputted video signal, an absolute value detector 14 for detecting the absolute value of the first degree-differentiated video signal from the sample memories 11 and 12 and the adder 13, a comparator 15 for comparing the detected absolute value from the absolute value detector 14 with the reference value TH, checking presence of the transient edge in the inputted video signal and outputting the resultant transient edge signal, bit memories 16 and 17 and a filter 18 for cooperating to filter a noise component of the transient edge signal from the comparator 15 to reduce an error occurring due to the noise component in detecting the transient edge, and a transient edge detecting logic circuit 19 for sequentially delaying the transient edge signal filtered from the filter 18, decoding bits of the adjacent transient edge signals and outputting the transient edge detection signal if the decoded signals are successively high.

The transient edge detecting logic circuit 19 includes a bit delay 19a for sequentially delaying the transient edge signal filtered from the filter 18 and a decoder logic unit 19b for decoding the adjacent bits of the transient edge signals from the bit delay 19a and outputting the transient edge detection signal if the decoded signals are successively high.

Referring to FIG. 8, there is shown a functional block diagram of the transient edge dividing circuit 1b in the apparatus in FIG. 5. As shown in this drawing, the transient edge dividing circuit 1b includes sample memories 20 and 21 and an adder 22 for cooperating to second degree-differentiate the absolute value J1 of the first degree-differentiated video signal from the transient edge detecting circuit 1a, and sample memories 23 and 24 and an adder 25 for cooperating to third degree-differentiate the second degree-differentiated value from the sample memories 20 and 21 and the adder 22 and output the resultant transient edge divide signal which is divided into the interpolation and replacement intervals.

Figure 10:
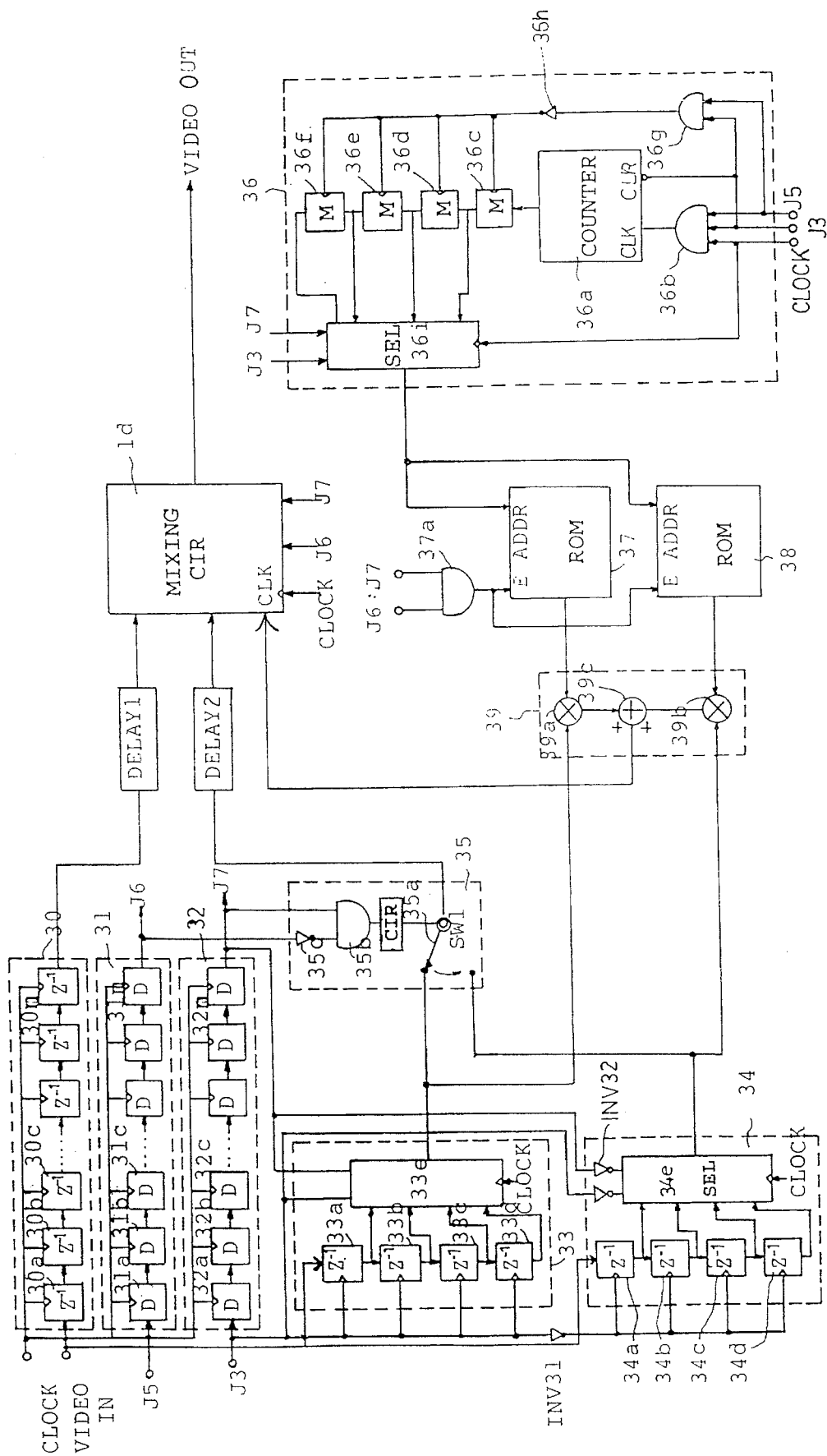
FIG. 10 is a functional block diagram of a transient edge interpolating circuit in the apparatus in FIG. 5.

Referring to FIG. 10 there is shown a functional block diagram of the transient edge interpolating circuit 1c in the apparatus in FIG. 5. As shown in this figure, the transient edge interpolating circuit 1c includes a video signal delay circuit 30 for delaying the inputted video signal by n clocks in the unit of sample, a transient edge divide signal delay circuit 31 For delaying the transient edge divide signal J5 from the transient edge dividing circuit 1b by n clocks, a transient edge detection signal delay circuit 32 for delaying the transient edge detection signal J3 from the transient edge detecting circuit 1a by n clocks, a start pixel value storage unit 38 for storing the start pixel value of the transient edge based on the transient edge detection signal J3 from the transient edge detecting circuit 1a, and an end pixel value storage unit 84 for storing the end pixel value of the transient edge based on the transient edge detection signal /J3 inverted through an inverter gate INV31.

A pixel value selecting circuit 35 is also provided in the transient edge interpolating circuit 1c to select one of the start and end pixel values stored in the start pixel value and end pixel value storage units 33 and 34 in response to a n clocks delayed transient edge divide signal J6 from the transient edge divide signal delay circuit 31 and a n clocks delayed transient edge detection signal J7 from the transient edge detection signal delay circuit 82 and output the selected pixel value to the mixing circuit 1d.

An interpolation interval storage unit 36 is also provided in the transient edge interpolating circuit 1c to store a length of the interpolation interval in response to the transient edge divide signal J5 from the transient edge dividing circuit 1b and the transient edge detection signal J3 from the transient edge detecting circuit 1a and generate addresses based on the stored length of the interpolation interval.

The transient edge interpolating circuit 1c also includes ROMs 37 and 38 for outputting pixel values for weighting in response to the addresses from the interpolation interval storage unit 36, and an interpolation operation unit 39 for weighting the start and end pixel values stored in the start pixel value and end pixel value storage units 33 and 34 by the pixel values from the ROMs 37 and 38, respectively, and outputting the resultant value to the mixing circuit 1d.

An AND gate 37a is also provided in the transient edge interpolating circuit 1c to AND the n clocks delayed transient edge divide signal J6 from the transient edge divide signal delay circuit 31 and the n clocks delayed transient edge detection signal J7 from the transient edge detection signal delay circuit 32 and output the ANDed signal as enable signals E to the ROMs 37 and 38.

Here, the reference numerals DELAY1 and DELAY2 designate delay matching units.

The video signal delay circuit 30 includes sample memories 30a–30n for sequentially delaying the inputted video signal by clock in the unit of sample.

The transient edge divide signal delay circuit 31 includes bit memories 31a–31n for sequentially delaying the transient edge divide signal J5 from the transient edge dividing circuit 1b by clock in the unit of bit.

The transient edge detection signal delay circuit 32 includes bit memories 32a–32n for sequentially delaying the transient edge detection signal J3 from the transient edge detecting circuit 1a by clock in the unit of bit.

The start pixel value storage unit 38 includes sample memories 33a–33d for sequentially storing the start pixel value of the inputted video signal corresponding to the transient edge by clock in response to the transient edge detection signal J3 from the transient edge detecting circuit 1a whenever the transient edge is started, and a first input signal selecting circuit 33e for selecting a n clocks delayed one of the start pixel values sequentially stored in the sample memories 33a–33d in response to the transient edge detection signal J3 from the transient edge detecting circuit 1a and the n clocks delayed transient edge detection signal J7 from the transient edge detection signal delay circuit 32.

The end pixel value storage unit 34 includes sample memories 34a–84d for sequentially storing the end pixel value of the inputted video signal corresponding to the transient edge by clock in response to the transient edge detection signal /J3 inverted through the inverter gate INV81 whenever the transient edge is ended, and a second input signal selecting circuit 84e for selecting a n clocks delayed one of the end pixel values sequentially stored in the sample memories 84a–84d in response to the inverted transient edge detection signal /J3 and the delayed transient edge detection signal /J7 inverted through an inverter gate INV32.

Figure 11:
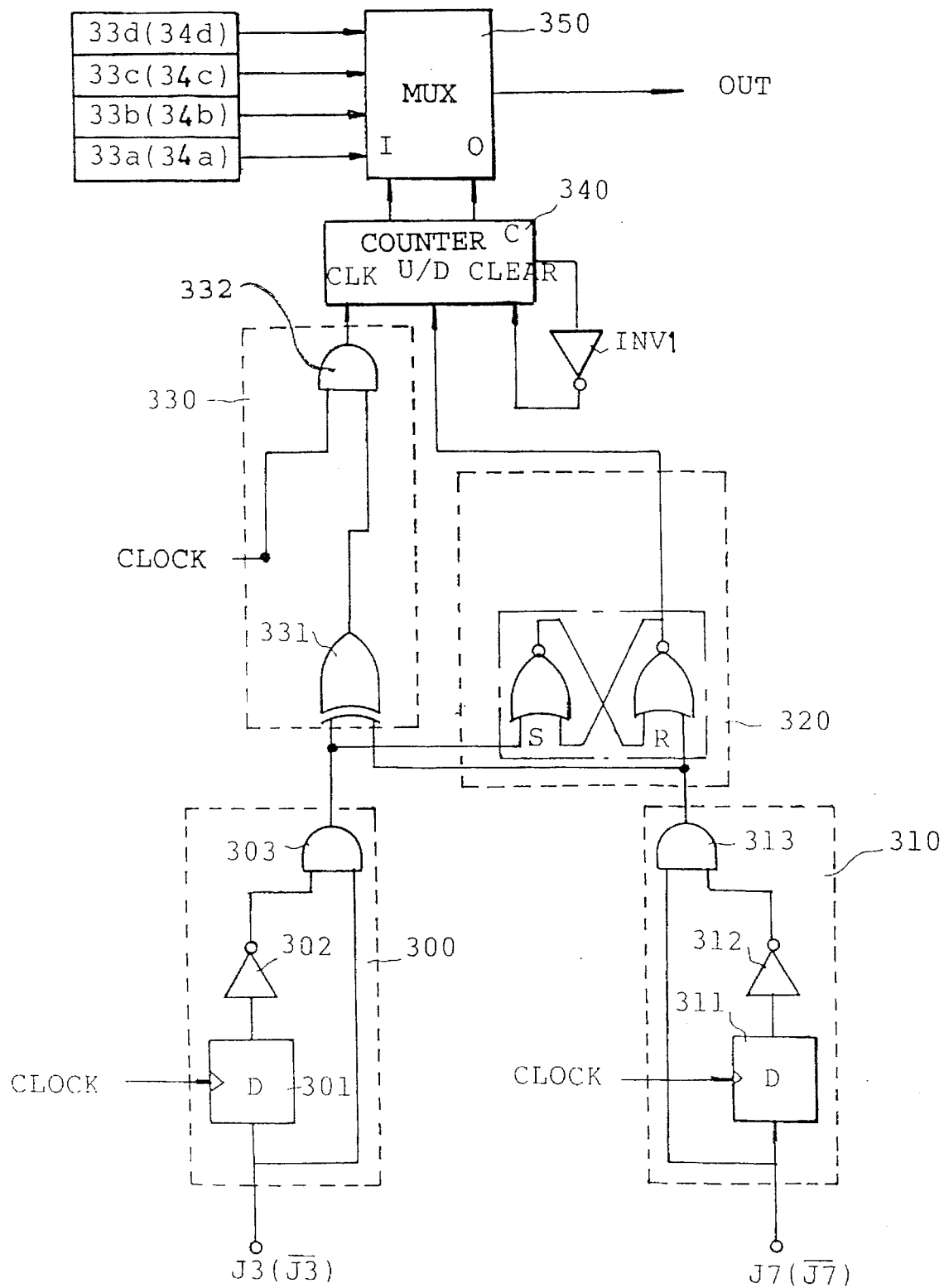
FIG. 11 is a functional block diagram of an input signal selecting circuit in the transient edge interpolating circuit in FIG. 10.

Referring to FIG. 11, there is shown a functional block diagram of the first or second input signal selecting circuit 33e or 34e in the start pixel value or end pixel value storage unit 33 or 34 in FIG. 10. As shown in this drawing, the first and second input signal selecting circuits 33e and 34e have the same construction and each of them includes a first point detector 300 for logically combining the transient edge detection signal J3 from the transient edge detecting circuit 1a or the inverted transient edge detection signal /J3 to detect a select point of the pixel value for interpolation or replacement and outputting the resultant pixel value select point signal, a second point detector 310 for logically combining the n clocks delayed transient edge detection signal J7 from the transient edge detection signal delay circuit 32 or the inverted delayed transient edge detection signal /J7 to detect a select point of the pixel value for interpolation or replacement and outputting the resultant pixel value select point signal, a counting controller 320 for controlling a counting operation in response to the pixel value select point signals from the first and second point detectors 300 and 310, a clock controller 330 for applying a clock in response to the pixel value select point signals from the first and second point detectors 300 and 310, a counter 340 for up or down counting the clock from the clock controller 330 under the control of the counting controller 320 and outputting the resultant pixel value select control signal, and a multiplexer 350 for selecting the n clocks delayed one of the start pixel values sequentially stored in the sample memories 33a–33d or the end pixel values sequentially stored in the sample memories 34a–34d in response to the pixel value select control signal from the counter 340 and outputting the selected pixel value as the pixel value for interpolation or replacement.

In the first input signal selecting circuit 33e, the first point detector 300 includes a bit memory 301 for storing the transient edge detection signal J3 from the transient edge detecting circuit 1a, an inverter gate 302 for inverting an output signal from the bit memory 301, and an AND gate 303 for ANDing an output signal from the inverter gate 302 and the transient edge detection signal J3 from the transient edge detecting circuit 1a and outputting the ANDed signal as the pixel value select point signal.

The second point detector 310 includes a bit memory 311 for storing the n clocks delayed transient edge detection signal J7 from the transient edge detection signal delay circuit 32, an inverter gate 312 for inverting an output signal from the bit memory 311, and an AND gate 313 for ANDing an output signal From the inverter gate 312 and the n clocks delayed transient, edge detection signal J7 from the transient edge detection signal delay circuit 32 and outputting the ANDed signal as the pixel value select point signal.

The counting controller 320 includes a RS flip-flop for controlling the up or down counting of the counter 340 in response to the pixel value select point signals from the first and second point detectors 300 and 810.

The clock controller 330 includes an exclusive OR gate 331 for exclusive-ORing the pixel value select point signals from the first and second point detectors 300 and 310 and outputting the exclusive-ORed signal as the clock to the counter 840 and an AND gate 832 for controlling the output from the exclusive OR gate 381.

In FIG. 10, the pixel value selecting circuit 85 includes a switch 35a for selecting one of the start and end pixel values stored in the start pixel value and end pixel value storage units 38 and 34, an inverter gate 35c for inverting the n clocks delayed transient edge divide signal J6 from the transient edge divide signal delay circuit 81, and an AND gate 35b for ANDing the n clocks delayed transient edge detection signal J7 from the transient edge detection signal delay circuit 32 and an output signal from the inverter gate 35c and outputting the ANDed signal as a control signal to the switch 35a to allow the switch 35a to select the start pixel value From the start pixel value storage unit 33 at a start point of the transient edge and select the end pixel value from the end pixel value storage unit 34 at an end point of the transient edge.

The interpolation interval storage unit 36 includes a counter 36a for counting the length of the interpolation interval of the transient edge, an AND gate 36b for ANDing a system clock, the transient edge divide signal J5 from the transient edge dividing circuit 1b and the transient edge detection signal J3 from the transient edge detecting circuit 1a and outputting the ANDed signal as a clock to the counter 36a, bit memories (M) 36c–86f for sequentially storing an output signal from the counter 36a, an AND gate 36g for ANDing the transient edge divide signal J5 from the transient edge dividing circuit 1b and the transient edge detection signal J3 from the transient edge detecting circuit 1a, an inverter gate 36h for inverting an output signal from the AND gate 36g and outputting the inverted signal as a drive signal to the bit memories 36c–36f, and an output signal selecting circuit 36i for selecting a n clocks delayed one of output signals from the bit memories 36c–36f as interpolation interval length information in response to the transient edge detection signal J3 from the transient edge detecting circuit 1a and the n clocks delayed transient edge detection signal J7 from the transient edge detection signal delay circuit 32 and outputting the selected interpolation interval length information as the addresses.

Figure 13:
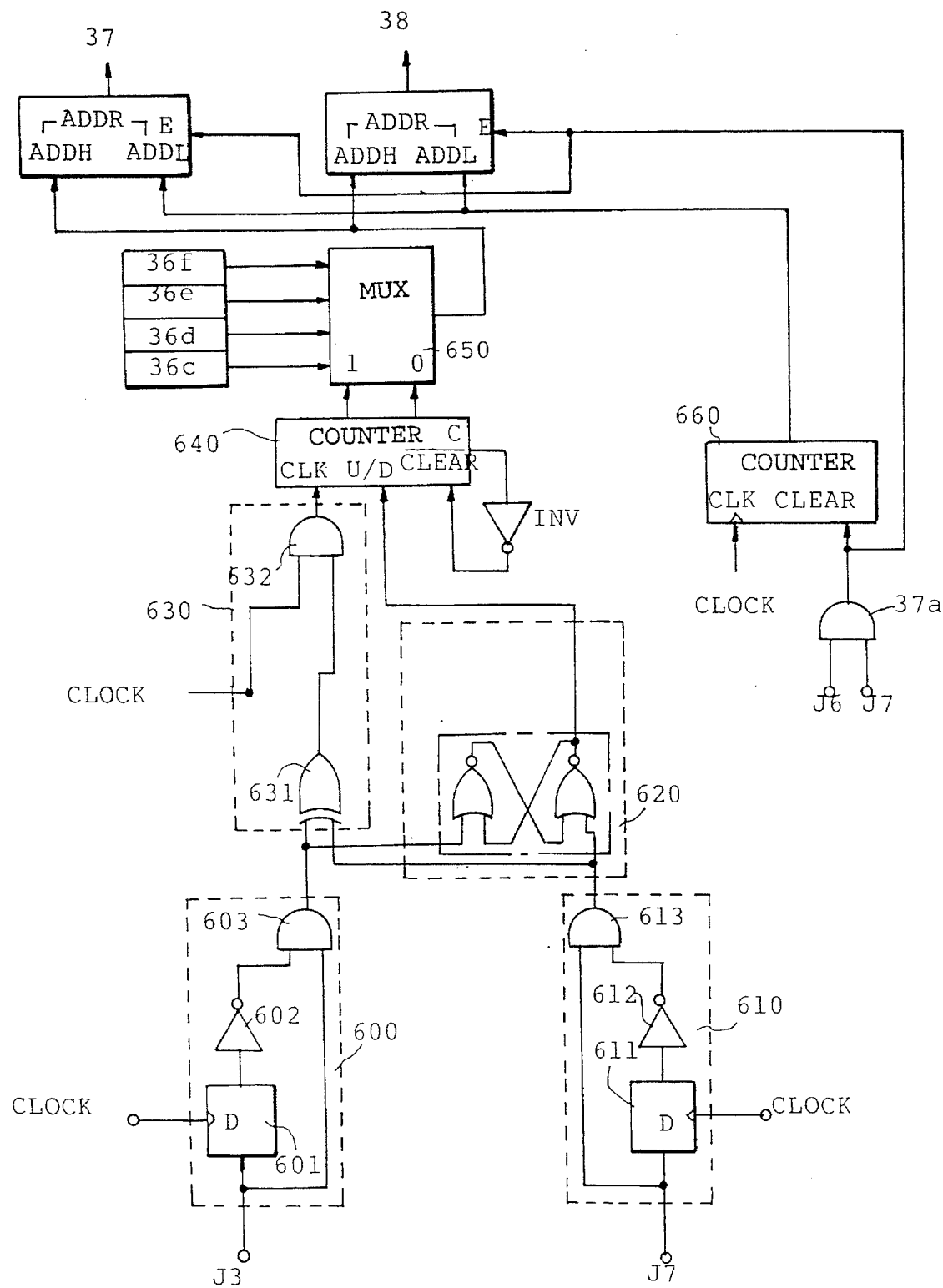
FIG. 13 is a functional block diagram of an output signal selecting circuit in the transient edge interpolating circuit in FIG. 10.

Referring to FIG. 13, there is shown a functional block diagram of the output signal selecting circuit (SEL) 36i in the interpolation interval storage unit 36 in FIG. 10. As shown in this drawing, the output signal selecting circuit 36i includes a first point detector 600 for logically combining the transient edge detection signal J3 from the transient edge detecting circuit 1a to detect a select point of the interpolation interval length information and outputting the resultant interpolation interval length information select point signal, a second point detector 610 for logically combining the n clocks delayed transient edge detection signal J7 from the transient edge detection signal delay circuit 32 to detect a select point of the interpolation interval length information and outputting the resultant interpolation interval length information select point signal, a counting controller 620 for controlling a counting operation in response to the interpolation interval length information select point signals from the first and second point detectors 600 and 610, a clock controller 630 for applying a clock in response to the interpolation interval length information select point signals from the first and second point detectors 600 and 610, a counter 640 for up or down counting the clock from the clock controller 630 under the control of the counting controller 620 and outputting the resultant interpolation interval length information select control signal, a multiplexer 650 for selecting the n clocks delayed one of the output signals from the bit memories 36c–36f as the interpolation interval length information in response to the interpolation interval length information select control signal from the counter 640 and outputting the selected interpolation interval length information as high order addresses ADDH to the ROMs 87 and 38, and a counter 660 for performing a counting operation in the interpolation interval of the transient edge and outputting the counted value as low order addresses ADDL to the ROMs 37 and 88.

The first point detector 600 includes a bit memory 601 for storing the transient edge detection signal J3 from the transient edge detecting circuit 1a, an inverter gate 602 for inverting an output signal from the bit memory 601, and an AND gate 603 for ANDing an output signal from the inverter gate 602 and the transient edge detection signal J3 from the transient edge detecting circuit 1a and outputting the ANDed signal as the interpolation interval length information select point signal.

The second point detector 610 includes a bit memory 611 for storing the n clocks delayed transient edge detection signal J7 from the transient edge detection signal delay circuit 32, an inverter gate 812 for inverting an output signal from the bit memory 611, and an AND gate 618 for ANDing an output signal from the inverter gate 612 and the n clocks delayed transient edge detection signal J7 from the transient edge detection signal delay circuit 32 and outputting the ANDed signal as the interpolation-interval length information select point signal.

The counting controller 620 includes a RS flip-flop for controlling the up or down counting of the counter 640 in response to the interpolation interval length information select point signals from the first and second point detectors 600 and 610.

The clock controller 630 includes an exclusive OR gate 631 for exclusive-ORing the interpolation interval length information select point signals from the first and second point detectors 600 and 610 and outputting the exclusive-ORed signal as the clock to the counter 640 and an AND gate 682 for controlling the output from the exclusive OR gate 681.

Figure 15:
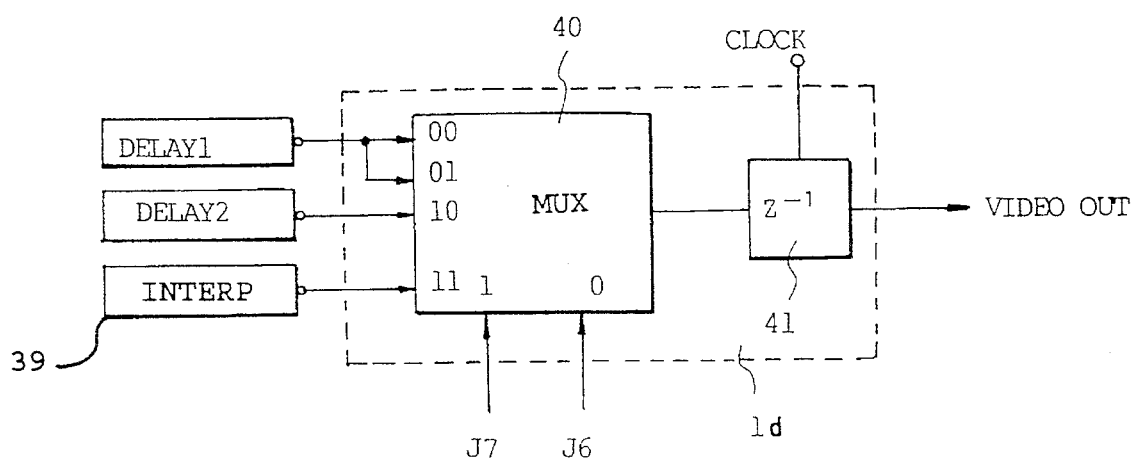
FIG. 15 is a functional block diagram of a mixing circuit in the apparatus in FIG. 5.

Referring to FIG. 15, there is shown a functional block diagram of the mixing circuit 1d in the apparatus in FIG. 5. As shown in this drawing, the mixing circuit 1d includes a multiplexer 40 for selecting appropriate video signals in the non-transient edge interval, the interpolation interval and the replacement interval, respectively, in response to the n clocks delayed transient edge divide signal J6 from the transient edge divide signal delay circuit 31 and the n clocks delayed transient edge detection signal J7 from the transient edge detection signal delay circuit 32, and a sample memory 41 for storing the video signal from the multiplexer 40 and then outputting the stored video signal.

A method of enhancing a transient edge of a video signal in accordance with the present invention comprises the first step of first degree-differentiating the video signal inputted therein, detecting an absolute value of the first degree-differentiated video signal and detecting the transient edge of the video signal in accordance with the detected absolute value, the second step of second degree-differentiating the absolute value of the first degree-differentiated video signal at the first step, third degree-differentiating the second degree-differentiated value and dividing the transient edge into interpolation and replacement intervals in accordance with the third degree-differentiated value, the third step of outputting the inputted video signal directly in a non-transient edge interval in which the transient edge is not detected at the first step, the fourth step of replacing start and end pixel values of the transient edge of the inputted video signal with start and end pixel values of the transient edge detected at the first step in the replacement interval of the transient edge divided at the second step, and the fifth step of interpolating a value which is obtained by weighting and averaging the start and end pixel values of the transient edge detected at the first step into the transient edge of the inputted video signal in the interpolation interval of the transient edge divided at the second step.

The operation of the enhancement apparatus with the above-mentioned construction in accordance with the present invention will hereinafter be described in detail with reference to FIGS. 5 to 15.

Upon inputting the video signal as shown in FIG. 6A, the transient edge detecting circuit 1a first degree-differentiates the inputted video signal, detects the absolute value of the first degree-differentiated video signal as shown in FIG. 6B and compares the detected absolute value with the reference value TH. At this time, if the detected absolute value is greater than the reference value TH, the present interval is the transient edge interval of the video signal. On the contrary, if the detected absolute value is not greater than the reference value TH, the present interval is the non-transient edge interval of the video signal. In this manner, the transient edge detecting circuit 1a detects the transient edge of the inputted video signal and outputs the resultant transient edge detection signal to the transient edge interpolating circuit 1c.

On the other hand, the absolute value off the first degree-differentiated video signal from the transient edge detecting circuit 1a is applied to the transient edge dividing circuit 1b, in the transient edge dividing circuit 1b, the absolute value of the first degree-differentiated video signal from the transient edge detecting circuit 1a is second degree-differentiated as shown in FIG. 6C and then third degree-differentiated as shown in FIG. 6D. As a result, the transient edge dividing circuit 1b outputs the transient edge divide signal resulting from the third degree-differentiated signal. Namely, the transient edge divide signal is divided into the replacement interval when a level of the third degree-differentiated signal is positive (+), the interpolation interval when the level of the third degree-differentiated signal is negative (−) and the non-transient edge interval when the level of the third degree-differentiated signal is 0.

The transient edge divide signal from the transient edge dividing circuit 1b is applied to the transient edge interpolating circuit 1c which is also applied with the transient edge detection signal from the transient edge detecting circuit 1a. In response to the applied transient edge divide signal and transient edge detection signal, the transient edge interpolating circuit 1c replaces the pixel values of the transient edge of the inputted video signal with the selected pixel values or interpolate the selected pixel values into the transient edge of the inputted video signal.

In other words, in the replacement interval of the transient edge divide signal from the transient edge dividing circuit 1b as shown by L1 and L3 in FIG. 6E, the start and end pixel values of the transient edge of the inputted video signal are replaced with the start and end pixel values of the transient edge based on the transient edge detection signal from the transient edge detecting circuit 1a. Also, in the interpolation interval of the transient edge divide signal as shown by L2 in FIG. 6E, the transient edge of the inputted video signal is interpolated using the start and end pixel values of the transient edge based on the transient edge detection signal from the transient edge detecting circuit 1a.

In order to determine an enhancement level of the transient edge of the inputted video signal in the interpolation interval L2, the start and end pixel values of the transient edge based on the transient edge detection signal are weighted by predetermined data. Therefore, the transient edge of the inputted video signal is linearly interpolated by the weighted pixel values in the interpolation interval L2.

The video signal replaced or interpolated in this manner is applied to the mixing circuit 1d. In response to the delayed transient edge detection signal and the delayed transient edge divide signal, the mixing circuit 1d outputs the inputted video signal delayed by a delay matching unit DELAY1 in the transient edge interpolating circuit 1c in the non-transient edge interval and outputs the video signal enhanced (replaced or interpolated) by the transient edge interpolating circuit 1c in the transient edge interval.

Comparing the waveforms in FIGS. 6A and 6E to each other, it can be seen that a band width of the transient edge of the outputted video signal is increased twice as large as that of the inputted video signal, since the band width (L1+L2+L3) of the transient edge is approximately 15 samples in FIG. 6A; however, the interpolation interval L2 is reduced to 7 samples in FIG. 6E.

Now, the operations of the transient edge detecting circuit 1a, the transient edge dividing circuit 1b, the transient edge interpolating circuit 1c and the mixing circuit 1d will be described in detail with reference to FIGS. 7 to 15.

As shown in FIG. 7, in the transient edge detecting circuit 1a, the inputted video signal is first degree-differentiated by the sample memories 11 and 12 and the adder 13. Namely, the inputted video signal is sequentially delayed 15 by one clock by the sample memories 11 and 12 which performs a read or write operation in response to the system clock CLOCK. The inputted video signal is then subtracted from the output signal from the sample memory 12 by the adder 13. As a result, the first degree-differentiated video signal is outputted from the adder 13.

The absolute value J1 of the first degree-differentiated video signal from the adder 13 is detected by the absolute value detector 14 and then applied to the transient edge dividing circuit 1b. The detected absolute value J1 from the absolute value detector 14 is also applied to the comparator 15 for comparison with the reference value TH. The comparator 15 compares the detected absolute value J1 from the absolute value detector 14 with the reference value TH to check the presence of the transient edge in the inputted video signal and outputs the resultant transient edge signal. Namely, of the absolute value J1 is greater than the reference value TH, the present interval is the transient edge interval. In this case, the comparator 15 outputs the transient edge signal of high level. On the other hand, if the absolute value J1 is not greater than the reference value TH, the present interval is the non-transient edge interval. In this case, the comparator 15 outputs the transient edge signal of low level.

The transient edge signal from the comparator 15 is sequentially delayed by one bit by the bit memories 16 and 17 which are driven in response to the system clock CLOCK, and the noise component thereof is then removed by the filter 18.

Then, the transient edge detecting logic circuit 19 sequentially delays the transient edge signal filtered from the filter 18 and decodes the adjacent bits of the transient edge signals sequentially delayed When the decoded signals are successively high, the transient edge detecting logic circuit 19 outputs the transient edge detection signal.

As mentioned above, the transient edge detection signal J3 from the transient edge detecting circuit 1a is applied to the transient edge interpolating circuit 1c and the absolute value J1 of the first degree-differentiated video signal from the absolute value detector 14 is applied to the transient edge dividing circuit 1b. The transient edge dividing circuit 1b second degree-differentiates the absolute value J1 of the first degree-differentiated video signal, third degree-differentiates the second degree-differentiated value and outputs the resultant transient edge divide signal which is divided into the interpolation and replacement intervals.

In detail, as shown in FIG. 8 in the transient edge dividing circuit 1b, the absolute value J1 of the first degree-differentiated video signal from the transient edge detecting circuit 1a is second degree-differentiated by the sample memories 20 and 21 and the adder 22. Namely, the absolute value J1 of the first degree-differentiated video signal is sequentially delayed by one clock by the sample memories 20 and 21 which are driven in response to the system clock CLOCK. The absolute value J1 of the first degree-differentiated video signal is then subtracted from the output signal from the sample memory 21 by the adder 22. As a result, the second degree-differentiated value is outputted from the adder 22.

The second degree-differentiated value from the adder 22 is sequentially delayed by one clock by the sample memories 23 and 24 which are driven in response to the system clock. The second degree-differentiated value from the adder 22 is then subtracted from the output signal from the sample memory 24 by the adder 25. As a result outputted from the adder 25 is the third degree-differentiated value which results in the transient edge,divide signal J5. In result, the adder 25 in the transient edge dividing circuit 1b outputs the transient edge divide signal J5 which is divided into the replacement interval when the level of the third degree-differentiated signal is positive (+) and the interpolation interval when the level of the third degree-differentiated signal is negative (−).

FIGS. 9A to 9D are timing diagrams of the signals in the transient edge dividing circuit 1b in FIG. 8, in which the interpolation and replacement intervals of the transient edge and the non-transient edge interval are shown FIG. 9A is a waveform diagram of the system clock CLOCK, FIG. 9B is a waveform diagram of the transient edge detection signal J3 from the transient edge detecting circuit 1a, FIG. 9C is a waveform diagram of the transient edge divide signal J5 from the transient edge dividing circuit 1b and FIG. 9D is a waveform diagram of the inputted video signal.

As shown in FIG. 9B, the present interval is determined as the transient edge interval when the transient edge detection signal J3 is high and as the non-transient edge interval when the transient edge detection signal J3 is low In FIG. 9C, the present interval is determined as the interpolation interval when the transient edge divide signal J5 is high in the transient edge interval as shown in FIG. 9B and as the replacement interval when the transient edge divide signal J5 is low in the transient edge interval as shown in FIG. 9B. In the interpolation and replacement intervals, the enhancement on of the transient edge the video signal is performed by the interpolation and replacement of the pixel values.

In other words, in the replacement interval of the transient edge, the start and end pixel values of the transient edge of the inputted video signal are replaced with the start and end pixel values of the video data at the start and end points of the transient edge based on the transient edge detection signal J3. In the interpolation interval the transient edge, the value which is obtained by weighting and averaging the start and end pixel values of the transient edge based on the transient edge detection signal J3 is interpolated into the transient edge of the inputted video signal. On the other hand, in the non-transient edge interval, the inputted video signal is directly outputted.

The above-mentioned replacement and interpolation of the pixel values ape performed by the transient edge interpolating circuit 1c as shown in FIG. 10.

In FIG. 10, the inputted video signal is delayed by n clocks in the unit of sample by the sample memories 30a–30n in the video signal delay circuit 30, the transient edge divide signal J5 from the transient edge dividing circuit 1b is delayed by n clocks by the bit memories 31a–31n in the transient edge divide signal delay circuit 31, and the transient edge detection signal J3 from the transient edge detecting circuit 1a is delayed by n clocks by the bit memories 31a–31n in the transient edge detection signal delay circuit 32.

Because the inputted video signal, the transient edge divide signal and the transient edge detection signal are delayed by n clocks as mentioned above, the start and end pixel values of the transient edge can be processed before performing the enhancement on the transient edge of the inputted video signal.

In other words, before performing the enhancement on the transient edge of the inputted video signal, the start pixel value of the transient edge is stored in the start pixel value storage unit 33 and the end pixel value of the transient edge is stored in the end pixel value storage unit 34. The start and end pixel values stored in the start and end pixel values storage units 33 and 34 are outputted at the n clocks delayed point to constitute the video signal in the transient edge interval.

In detail, in the start pixel value storage unit 33, the inputted video signal is applied as data to the sample memories 33a–33d and the transient edge detection signal J3 from the transient edge detecting circuit 1a is applied as a clock to the sample memories 33a–33d. As a result, the start pixel value of the transient edge is stored in the sample memories 33a–33d, being sequentially shifted from the first sample memory 33a to the last sample memory 33d whenever the transient edge is detected. Then, the first input signal selecting circuit 33e selects the n clocks delayed one of the start pixel values sequentially stored in the sample memories 33a–33d in response to the transient edge detection signal J3 from the transient edge detecting circuit 1a and the n clocks delayed transient edge detection signal J7 from the transient edge detection signal delay circuit 32.

In the end pixel value storage unit 34, the inputted video signal is applied as data to the sample memories 34a–34d and the transient edge detection signal /J3 inverted by the inverter gate INV31 is applied as a clock to the sample memories 34a–34d. As a result, the end pixel value of the transient edge is stored in the sample memories 34a–34d, being sequentially shifted from the first sample memory 34a to the last sample memory 34d whenever the non-transient edge interval is detected. Then, the second input signal selecting circuit 34e selects the n clocks delayed one of the end pixel values sequentially stored in the sample memories 34a–34d in response to the inverted transient edge detection signal /J3 and the n clocks delayed transient edge detection signal /J7 inverted through the inverter gate INV32.

The operation of selecting the start and end pixel values of the transient edge in the above manner will hereinafter be described in more detail with reference to FIGS. 11 to 12I.

First, the operation of the first input signal selecting circuit 33e for selecting the start pixel of the transient edge will be described. Upon receiving the transient edge detection signal J3 from the transient edge detecting circuit 1a as shown in FIG. 12B, the first point detector 300 logically combines the received transient edge detection signal J3 and outputs the resultant pixel value select point signal. Namely, in the first point detector 300, the transient edge detection signal J3 is delayed by the bit memory 301 which is driven in response to the system clock CLOCK as shown in FIG. 12A, and then inverted by the inverter gate 302. The AND gate 303 ANDs the output signal from the inverter gate 302 and the transient edge detection signal J3 and outputs the ANDed signal as the start pixel value select point signal as shown in FIG. 12D.

On the other hand, the n clocks delayed transient edge detection signal J7 from the transient edge detection signal delay circuit 32 is applied to the second point detector 310. In the second point detector 310, the n clocks delayed transient edge detection signal J7 is delayed by the bit memory 311 which is driven in response to the system clock CLOCK and then inverted by the inverter gate 312. The AND gate 313 ANDs the output signal from the inverter gate 312 and the n clocks delayed transient edge detection signal J7 and outputs the ANDed signal as the n clocks delayed start pixel value select point signal as shown in FIG. 12E.

The RS flip-flop of the counting controller 320 inputs the output signal from the first point detector 300 as shown in FIG. 12D at its set input terminal S and the output signal from the second point detector 310 as shown in FIG. 12E at its reset input terminal R and outputs a counter control signal as shown in FIG. 12H.

The counter control signal from, the RS flip-flop of the counting controller 320 is applied to an up/down input terminal U/D of the counter 340. As a result, the counter 340 performs the up counting operation when the counter control signal is high and the down counting operation when the counter control signal is low. Also, a carry signal C is generated in the counter 340, inverted by an inverter gate INV1 and then applied to a clear input terminal CLEAR of the counter 340. As a result, the counter 340 is cleared whenever the carry signal C is generated.

Also, the output signals from the first and second point detectors 300 and 310 are applied to the clock controller 330 for the purpose of controlling supply and blockage of the clock to the counter 340. Namely, in the clock controller 330, the exclusive-OR gate 331 exclusive-ORs the signals as shown in FIGS. 12D and 12E and outputs the exclusive-ORed signal as the clock to the counter 340 through the AND gate 332. At this time, the AND gate 332 passes the clock or the output signal from the exclusive-OR gate 331 to a clock input terminal CLK of the counter 340 in only an interval in which the signals as shown in FIGS. 12D and 12E are different in level.

Accordingly, since the counter 340 is applied with the counter clock CLK in only the interval indicated by ON in FIG. 12H, it is not driven in the interval indicated by OFF in FIG. 12H. Namely, the counter 340 performs the up counting operation when the counter control signal is high in the ON interval and the down counting operation when the counter control signal is low in the ON interval. In other words, the counter 340 performs the up counting operation as shown in FIG. 12H at the start point of the transient edge as shown in FIG. 12D and performs the down counting operation as shown in FIG. 12H at the start point of the n clocks delayed transient edge as shown in FIG. 12E.

The counted value from the counter 340 is applied as the pixel value select control signal to the multiplexer 350. In response to the pixel value select control signal from the counter 340, the multiplexer 350 selects one of the start pixel values sequentially stored in the sample memories 33a– 33d corresponding to the present point and outputs the selected pixel value as the pixel value for interpolation or replacement. Namely, when the transient edge detection signal goes high or rises as shown in FIG. 12B because the transient edge is generated, the pixel values stored in the sample memories 33a–33d are shifted to the next, respectively. Also, in this timing, the counter 340 performs the up counting operation as shown in FIGS. 12D and 12H. As a result, in this case, the multiplexer 350 selects the pixel value in the next one of the sample memories 33a–33d as the start pixel value.

When the n clocks delayed transient edge detection signal goes high or rises as shown in FIG. 12C because the pixel value replacement and interpolation are ended with respect to the previous transient edge, the counter 340 performs the down counting operation as shown in FIGS. 12E and 12H. As a result, in this case, the multiplexer 350 selects the new pixel value in the previous one of the sample memories 33a–33d as the start pixel value.

On the other hand, the transient edge detection signal J3 from the transient edge detecting circuit 1a as shown in FIG.

12B is inverted by the inverter gate INV31 and the inverted transient edge detection signal /J3 is then applied to the second input signal selecting circuit 34e. Also, the n clocks delayed transient edge detection signal J7 from the transient edge detection signal delay circuit 32 as shown in FIG. 12C is inverted by the inverter gate INV32 and the inverted n clocks delayed transient edge detection signal /J7 is applied to the second input signal selecting circuit 34e.

In this case, the first point detector 300 outputs the end pixel value select point signal as shown in FIG. 12F and the second point detector 310 outputs the n clocks delayed end pixel value select point signal as shown in FIG. 12G. In response to the output signals from the first and second point detectors 300 and 310, the RS flip-flop of the counting controller 320 outputs a counter control signal as shown in FIG. 12I which controls the up or down counting operation of the counter 340 at the end point of the transient edge. In this timing, the clock controller 330 controls ON/OFF of the counter 340. The operation of the second input signal selecting circuit 34e is the same as that of the first input signal selecting circuit 33e and a detailed description thereof will thus be omitted.

Subsequently, the counter 340 performs the up counting operation when the counter control signal is high in the ON interval as shown in FIG. 12I and the down counting operation when the counter control signal is low in the ON interval as shown in FIG. 12I.

The counted value from the counter 340 is applied as the pixel value select control signal to the multiplexer 350. In response to the pixel value select control signal from the counter 340, the multiplexer 350 selects one of the end pixel values sequentially stored in the sample memories 34a–34d corresponding to the present point and outputs the selected pixel value as the pixel value for interpolation or replacement. Namely, at the falling edge of the transient edge detection signal or the rising edge of the inverted transient edge detection signal, the pixel values stored in the sample memories 34a–34d are shifted to the next, respectively. Also, in this timing, the counter 340 performs the up counting operation. As a result, in this case, the multiplexer 350 selects the pixel value in the next one of the sample memories 34a–34d as the end pixel value.

At the falling edge of the n clocks delayed transient edge detection signal or the rising edge of the inverted n clocks delayed transient edge detection signal, the counter 340 performs the down counting operation. As a result, in this case, the multiplexer 350 selects the new pixel value in the previous one of the sample memories 34a–34d as the end pixel value. The start and end pixel values selected in the above manner are applied to the pixel value selecting circuit 35.

The pixel value selecting circuit 35 selects one of the start and end pixel values stored in the start pixel value and end pixel value storage units 33 and 34 in response to the n clocks delayed transient edge divide signal J6 from the transient edge divide signal delay circuit 31 and the n clocks delayed transient edge detection signal J7 from the transient edge detection signal delay circuit 32 and output the selected pixel value to the mixing circuit 1d. Namely, in the pixel value selecting circuit 35, the switch 35a selects the start pixel value DATA1 in the front replacement interval of the transient edge as shown in FIG. 9 and the end pixel value DATA3 in the rear replacement interval of the transient edge as shown in FIG. 9 in response to the control signal from the AND gate 35b. The AND gate 35b ANDs the n clocks delayed transient edge detection signal J7 from the transient edge detection signal delay circuit 32 and the inverted n clocks delayed transient edge divide signal /J6 from the inverter gate 35c and outputs the ANDed signal as the control signal to the switch 35a (see the signal timing as shown in FIGS. 9B and 9C).

The start and end pixel values from the start pixel value and end pixel value storage units 33 and 34 are also applied to the interpolation operation unit 39, which performs the arrangement of the pixel values in the interpolation interval using the applied start and end pixel values.

On the other hand, the interpolation interval storage unit 36 stores the length of the interpolation interval in response to the transient edge divide signal J5 from the transient edge dividing circuit 1b and the transient edge detection signal J3 from the transient edge detecting circuit 1a and generates the addresses based on the stored length of the interpolation interval. Namely, in the interpolation interval storage unit 38, the AND gate 36b ANDs the system clock CLOCK, the transient edge divide signal J5 from the transient edge dividing circuit 1b and the transient edge detection signal J3 from the transient edge detecting circuit 1a and outputs the ANDed signal as the clock CLK to the counter 36a, which also inputs the transient edge detection signal J3 at its clear input terminal CLR. As a result, the counter 36a is cleared in the non-transient edge interval and performs the counting operation in only the-interpolation interval of the transient edge. In other words, the counter 36a counts the length of the interpolation interval (the number of clocks) of the transient edge and is reset due to the clear input CLR in the intervals other than the interpolation interval.

The counted value from the counter 36a is stored in the bit memories 36c–36f, being sequentially shifted from the first memory 36c to the last memory 36f whenever the interpolation interval of the transient edge is ended. Namely, the AND gate 36g ANDs the transient edge divide signal J5 from the transient edge dividing circuit 1b and the transient edge detection signal J3 from the transient edge detecting circuit 1a and outputs the ANDed signal as the drive signal to the bit-memories 36c–36f through the inverter gate 36h. As a result, since the drive signal from the AND gate 36g and the inverter gate 36b is applied to the bit memories 36c–36f whenever the interpolation interval of the transient edge is ended, the counted value from the counter 36a is stored in the bit memories 36c–36f, being sequentially shifted from the first memory 36c to the last memory 36f.

The capacity of each of the bit memories 36c–36f is determined according to a length of the transient edge For example, if the length of the transient edge is 15 clocks, the bit memories 36c–36f may be 4-bit memories ($2^4$=16).

Then, the output signal selecting circuit 36i selects the n clocks delayed one of the output signals from the bit memories 36c–36f as the interpolation interval length information in response to the transient edge detection signal J3 from the transient edge detecting circuit 1a and the n clocks delayed transient edge detection signal J7 from the transient edge detection signal delay circuit 32 and outputs the selected interpolation interval length information as the addresses to the ROMs 38 and 38.

Figure 12:
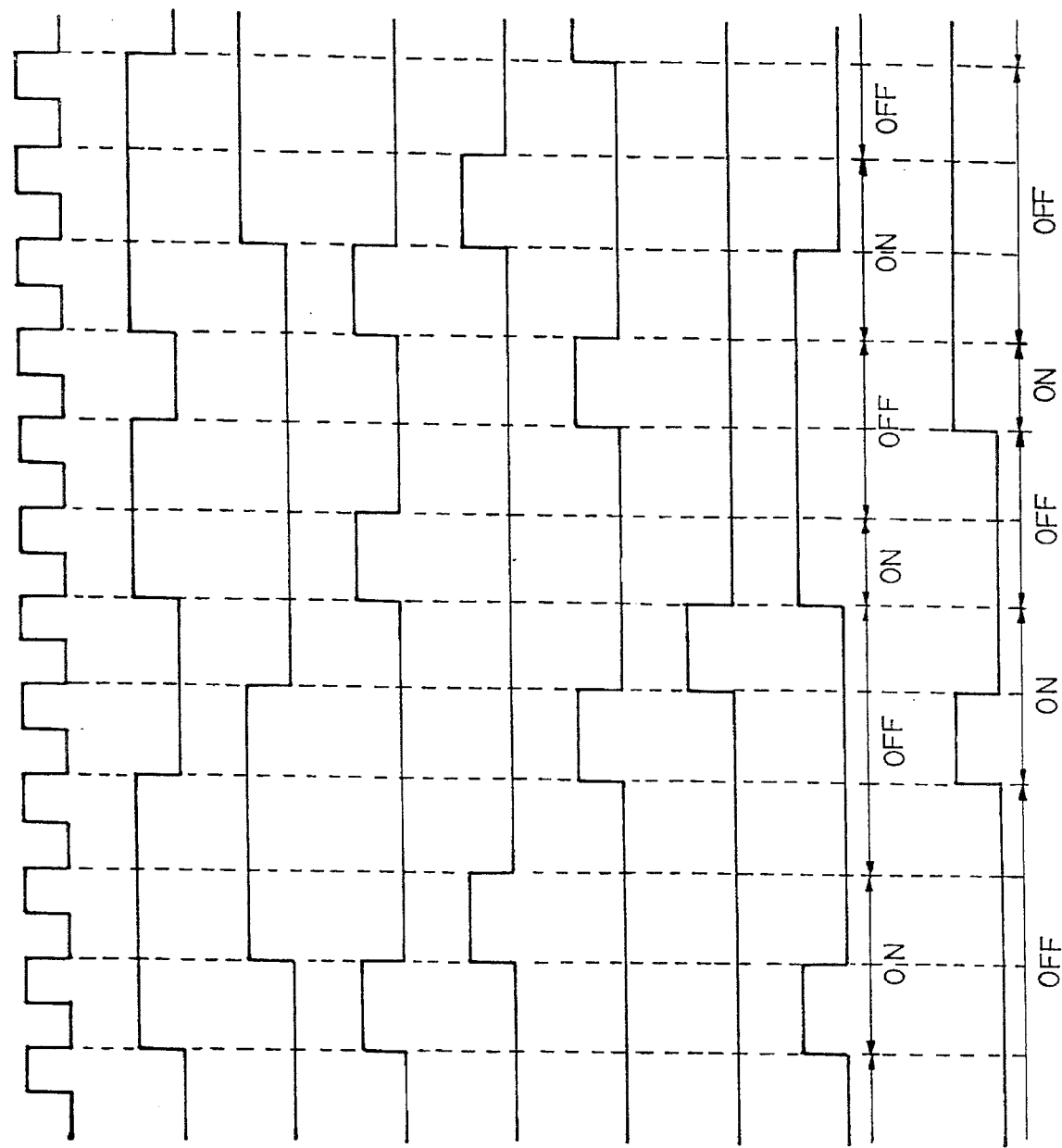
FIGS. 12A to 12I are timing diagrams of signals in the input signal selecting circuit in FIG. 11.

In detail, as shown in FIG. 13, in the output signal selecting circuit 36i, the first point detector 600, the second point detector 610, the counting controller 620, the clock controller 630 and the counter 640 have the same timing as those in the first and second input signal selecting circuits 33e and 34e as shown in FIGS. 11 to 12I.

Therefore, the counter 640 up or down counts from the start point of the transient edge up to n clocks until the replacement or interpolation signal process. The counted value from the counter 640 is applied as the control signal to the multiplexer 650. In response to the interpolation interval length information select control signal from the counter 640, the multiplexer 650 selects the n clocks delayed one of the output signals from the bit memories 36c–36f as the interpolation interval length information and outputs the selected interpolation interval length information as the high order addresses ADDH to the ROMs 37 and 38.

On the other hand, the AND gate 37a ANDs the n clocks delayed transient edge divide signal J6 from the transient edge divide signal delay circuit 31' and the n clocks delayed transient edge detection signal J7 from the transient edge detection signal delay circuit 32 and outputs the ANDed signal to a clear input terminal CLR of the counter 660. As a result, the counter 660 counts the system clock CLOCK in the interpolation interval of the transient edge since the output of the AND gate 37a is high at that time, and is cleared in the intervals other than the interpolation interval of the transient edge since the output of the AND gate 37a is low at that time.

Hence, the counted value from the counter 660 is incremented in the interpolation interval of the transient edge and the incremented value is then applied as the low order addresses ADDL to the ROMs 37 and 38. Then, the pixel values for weighting as shown in FIGS. 14A and 14B are outputted from locations of the ROMs 37 and 38 corresponding to the high and low order addresses ADDH and ADDL from the multiplexer 650 and the counter 660 in the interpolation interval storage unit 36. By the way, the ROMs 37 and 38 are enabled in only the interpolation interval of the transient edge since the output signal from the AND gate 37a is applied as the enable signals E thereto. For this reason, the pixel values are outputted from the locations of the ROMs 37 and 38 corresponding to the addresses ADDR from the interpolation interval storage unit 36 and are processed for the interpolation interval as shown in FIG. 10.

That is, in the interpolation interval of the transient edge, the interpolation operation unit 39 weights the start and end pixel values from the start pixel value and end pixel value storage units 33 and 34 by the pixel values from the ROMs 37 and 38, respectively, and outputs the resultant value to the mixing circuit 1d. In the interpolation operation unit 39, a multiplier 39a multiplies the start pixel value from the start pixel value storage unit 33 by the weighting pixel value from the ROM 37 as shown in FIGS. 14A and 14B and a multiplier 39b multiplies the end pixel value from the end pixel value storage unit 34 by the weighting pixel value from the ROM 38 as shown in FIGS. 14A and 14B. Then, an adder 39c adds the output pixel values from the multipliers 39a and 39b and outputs the resultant pixel value for the interpolation interval, that is, the interpolated video signal to the mixing circuit 1d.

Then, the pixel value to be interpolated (the output of the interpolation operation unit 39), the pixel values to be replaced (the output of the pixel value selecting circuit and the inputted video signal (the output of the video signal delay circuit 30) are applied to the mixing circuit 1d. In response to the n clocks delayed transient edge divide signal J6 from the transient edge divide signal delay circuit 31 and the n clocks delayed transient edge detection signal J7 from the transient edge detection signal delay circuit 32, the mixing circuit 1d outputs the inputted video signal in the non-transient edge interval and the video signal enhanced (replaced or interpolated) in the transient edge interval in the timing as shown in FIGS. 6A to 6E and FIGS. 9A to 9D. As a result outputted from the mixing circuit 1d is the final video signal in which the transient edge has been enhanced.

Here, the delay matching units DELAY1 and DELAY2 are adapted to, match the video signal from the video signal delay circuit 30 with the pixel values so as to unify the whole of the signal process timing.

In the non-transient edge interval in which the n clocks delayed transient edge detection signal J7 is low, the multiplexer 40 in the mixing circuit 1d outputs directly the video signal from the video signal delay circuit 30, the delay time of which is compensated by the delay matching unit DELAY1. In the replacement interval of the transient edge in which the n clocks delayed transient edge detection signal J7 is high and the n clocks delayed transient edge divide signal J6 is low, the multiplexer 40 selects the output pixel value (start or end pixel value) from the pixel value selecting circuit 35, the delay time of which is compensated by the delay matching unit DELAY2. In the interpolation interval of the transient edge in which the n clocks delayed transient edge detection signal J7 is high and the n clocks delayed transient edge divide signal J6 is high, the multiplexer 40 selects the interpolated pixel value from the interpolation operation unit 39. Then, in response to the system clock CLOCK, the sample memory 41 stores the output signal from the multiplexer 40 and then outputs the final video signal in which the transient edge has been enhanced.

As apparent from the above description, according to the present invention, the enhancement on the transient edge is performed, being divided into the interpolation and replacement intervals. This has the effect of actually reducing the width of the transient edge and, thus, obtaining the distinct video picture of the increased band width. Also, the division of the transient edge into the interpolation and replacement intervals makes it possible to determine the width of the transient edge as needed to accurately enhance the transient edge.

In the case where the conventional enhancement apparatus was applied simultaneously to the luminance and chrominance signals of the video signal, the degradation in the picture quality would be caused due to the different band width centers of the resultant enhanced signal resulting from the different band widths of the luminance and chrominance signals. However, in accordance with the present invention, the band width center of the enhanced signal is fixed resulting in no degradation in the picture quality, since the enhancement on the transient edge is performed, being divided into the interpolation and replacement intervals, and it is performed according to the interpolation interval length information in the interpolation interval.

Moreover, the enhancement on the transient edge is performed with due regard to the human visual characteristic because the sharp transient edge is processed as the non-transient edge. Further, the truth of the pixel value of the transient edge is ascertained depending on the correlation between the successive samples in the process of detecting the transient edge. This has the effect of preventing the noise component from being enhanced and removing the noise component from the transient edge.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for enhancing a transient edge of a video signal, comprising:

transient edge detecting means for first degree-differentiating said video signal, comparing an absolute value of the first degree-differentiated video signal with a reference value, detecting the transient edge of the video signal in accordance with the compared result and outputting a resultant transient edge detection signal;

transient edge dividing means for second degree-differentiating the absolute value of the first degree-differentiated video signal from said transient edge detecting means, third degree-differentiating the second degree-differentiated value and outputting a resultant transient edge divide signal which is divided into interpolation and replacement intervals;

transient edge interpolating means for interpolating a value which is obtained by weighting and averaging start and end pixel values of the transient edge based on the transient edge detection signal from said transient edge detecting means into the transient edge of said video signal in the interpolation interval of the transient edge divide signal from said transient edge dividing means and for replacing start and end pixel values of the transient edge of said video signal with the start and end pixel values of the transient edge based on the transient edge detection signal from said transient edge detecting means in the replacement interval of the transient edge divide signal from said transient edge dividing means; and mixing means for outputting said video signal in a non-transient edge interval and the interpolated or replaced video signal from said transient edge interpolating means in a transient edge interval.

2. An apparatus for enhancing a transient edge of a video signal, as set forth in claim 1, wherein said transient edge detecting means includes:

first and second sample memories and an adder connected for first-degree differentiating said video signal;

an absolute value detector for detecting the absolute value of the first degree-differentiated video signal from said first and second sample memories and said adder;

a comparator for comparing the detected absolute value from said absolute value detector with said reference value, checking the presence of the transient edge in said video signal and outputting a resultant transient edge signal;

first and second bit memories and a filter for filtering a noise component of the transient edge signal from said comparator to provide a filtered transient edge signal with a reduced error occurring due to the noise component in detecting the transient edge; and a transient edge detecting logic circuit for sequentially delaying the filtered transient edge signal filtered from said filter, decoding adjacent bits of the filtered transient edge signal and outputting the transient edge detection signal if the decoded adjacent bits are successively high.

3. An apparatus for enhancing a transient edge of a video signal, as set forth in claim 2, wherein said transient edge detecting logic circuit includes:

a bit delay for sequentially delaying the filtered transient edge signal filtered from said filter; and a decoder logic unit for decoding the bits of the adjacent transient edge signals from said bit delay and outputting the transient edge detection signal if the decoded signals are successively high.

4. An apparatus for enhancing a transient edge of a video signal, as set forth in claim 1, wherein said transient edge dividing means includes:

first and second sample memories and a first adder connected for second-degree differentiating the absolute value of the first degree-differentiated video signal from said transient edge detecting means; and third and fourth sample memories and a second adder connected for third-degree differentiating the second degree-differentiated absolute value from said first and second sample memories and said first adder and outputting the resultant transient edge divide signal which is divided into the interpolation and replacement intervals.

5. An apparatus for enhancing a transient edge of a video signal, as set forth in claim 1, wherein said transient edge interpolating means includes:

a video signal delay circuit for delaying said video signal by n clocks to provide said video signal as delayed as an input to said mixing means;

a transient edge divide signal delay circuit for delaying the transient edge divide signal from said transient edge dividing means by n clocks;

a transient edge detection signal delay circuit for delaying the transient edge detection signal from said transient edge detecting means by n clocks;

a start pixel value storage unit for storing the start pixel value of the transient edge based on the transient edge detection signal from said transient edge detecting means;

an end pixel value storage unit for storing the end pixel value of the transient edge based on the transient edge detection signal inverted through a first inverter gate;

a pixel value selecting circuit for selecting one of the start and end pixel values stored in said start pixel value and end pixel value storage units in response to a n clocks delayed transient edge divide signal from said transient edge divide signal delay circuit and a n clocks delayed transient edge detection signal from said transient edge detection signal delay circuit and outputting the selected pixel value to said mixing means;

an interpolation interval storage unit for storing a length of the interpolation interval in response to the transient edge divide signal from said transient edge dividing means and the transient edge detection signal from said transient edge detecting means and generating addresses based on the stored length of the interpolation interval;

first and second ROMs for outputting pixel values for weighting in response to the addresses from said interpolation interval storage unit; and an interpolation operation unit for weighting the start and end pixel values stored in said start pixel value and end pixel value storage units by the pixel values from said first and second ROMs, respectively, and outputting a resultant value to said mixing means.

6. An apparatus for enhancing a transient edge of a video signal, as set forth in claim 5, wherein said video signal delay circuit includes:

a plurality of sample memories for sequentially delaying said video signal by clocks in the unit of sample, 7. An apparatus for enhancing a transient edge of a video signal, as set forth in claim 5, wherein said transient edge divide signal delay circuit includes:

a plurality of bit memories for sequentially delaying the transient edge divide signal from said transient edge dividing means by clocks in the unit of bit.

8. An apparatus for enhancing a transient edge of a video signal, as set forth in claim 5, wherein said transient edge detection signal delay circuit includes:

a plurality of bit memories for sequentially delaying the transient edge detection signal from said transient edge detecting means by clocks in the unit of bit.

9. An apparatus for enhancing a transient edge of a video signal, as set forth in claim 5, wherein said start pixel value storage unit includes:

a plurality of sample memories for sequentially storing the start pixel value of said video signal corresponding to the transient edge by clocks in response to the transient edge detection signal from said transient edge detecting means whenever the transient edge is started; and an input signal selecting circuit for selecting a n clocks delayed one of the start pixel values sequentially stored in said sample memories in response to the transient edge detection signal from said transient edge detecting means and the n clocks delayed transient edge detection signal from said transient edge detection signal delay circuit.

10. An apparatus for enhancing a transient edge of a video signal, as set forth in claim 5, wherein said end pixel value storage unit includes:

a plurality of sample memories for sequentially storing the end pixel value of said video signal corresponding to the transient edge by clocks in response to the inverted transient edge detection signal whenever the transient edge is ended; and an input signal selecting circuit for selecting an clocks delayed one of the end pixel values sequentially stored in said sample memories in response to the inverted transient edge detection signal and the n clocks delayed transient edge detection signal inverted through a second inverter gate.

11. An apparatus for enhancing a transient edge of a video signal, as set forth in claim 9, wherein said input signal selecting circuit includes:

a first point detector for logically combining the transient edge detection signal from said transient edge detecting means to detect a first select point of the pixel value for interpolation or replacement and outputting a resultant first pixel value select point signal;

a second point detector for logically combining the n clocks delayed transient edge detection signal from said transient edge detection signal delay circuit to detect a second select point of the pixel value for interpolation or replacement and outputting a resultant second pixel value select point signal;

a counting controller for controlling a counting operation in response to the first and second pixel value select point signals from said first and second point detectors;

a clock controller for applying a clock in response to the first and second pixel value select point signals from said first and second point detectors;

a counter for up or down counting the clock from said clock controller under the control of said counting controller and outputting a resultant pixel value select control signal; and a multiplexer for selecting the n clocks delayed one of the start pixel values sequentially stored in said sample memories in response to the pixel value select control signal from said counter and outputting the selected one of said start pixel values as the pixel value for interpolation or replacement.

12. An apparatus for enhancing a transient edge of a video signal, as set forth in claim 11, wherein said first point detector includes:

a bit memory for storing the transient edge detection signal from said transient edge detecting means;

an inverter for inverting an output signal from said bit memory; and an AND gate for ANDing an output signal from said inverter and the transient edge detection signal from said transient edge detecting means and outputting the ANDed signal as the first pixel value select point signal.

13. An apparatus for enhancing a transient edge of a video signal, as set forth in claim 11, wherein said second point detector includes:

a bit memory for storing the n clocks delayed transient edge detection signal from said transient edge detection signal delay circuit;

an inverter for inverting an output signal from said bit memory; and an AND gate for ANDing an output signal from said inverter and the n clocks delayed transient edge detection signal from said transient edge detection signal delay circuit and outputting the ANDed signal as the second pixel value select point signal.

14. An apparatus for enhancing a transient edge of a video signal, as set forth in claim 11, wherein said counting controller includes:

a RS flip-flop for controlling the up or down counting of said counter in response to the pixel value select point signals from said first and second point detectors.

15. An apparatus for enhancing a transient edge of a video signal as set forth in claim 11, wherein said clock controller includes:

an exclusive-OR gate for exclusive-ORing the pixel value select point signals from said first and second point detectors and outputting the exclusive-ORed signal as the clock to said counter; and an AND gate for controlling the output from said exclusive-OR gate.

16. An apparatus for enhancing a transient edge of a video signal, as set forth in claim 5, wherein said pixel value selecting circuit includes:

a switch for selecting one of the start and end pixel values stored in said start pixel value and end pixel value storage units;

a second inverter gate for inverting the n clocks delayed transient edge divide signal from said transient edge divide signal delay circuit; and an AND gate for ANDing the n clocks delayed transient edge detection signal from said transient edge detection signal delay circuit and an output signal from said second inverter gate and outputting the ANDed signal as a control signal to said switch to allow said switch to select the start pixel value from said start pixel value storage unit at a start point of the transient edge and select the end pixel value from said end pixel value storage unit at an end point of the transient edge.

17. An apparatus for enhancing a transient edge of a video signal, as set forth in claim 5, wherein said interpolation interval storage unit includes:

a first counter for counting the length of the interpolation interval of the transient edge;

a first AND gate for ANDing a system clock, the transient edge divide signal from said transient edge dividing means and the transient edge detection signal from said transient edge detecting means and outputting the ANDed signal as a clock to said first counter;

first to fourth bit memories for sequentially storing an output signal from said first counter;

a second AND gate for ANDing the transient edge divide signal from said transient edge dividing means and the transient edge detection signal from said transient edge detecting means;

an inverter for inverting an output signal from said second AND gate and outputting the inverted signal as a drive signal to said first to fourth bit memories; and an output signal selecting circuit for selecting a n clocks delayed one of output signals from said first to fourth bit memories as interpolation interval length information in response to the transient edge detection signal from said transient edge detecting means and the n clocks delayed transient edge detection signal from said transient edge detection signal delay circuit and outputting the selected interpolation interval length information as the addresses.

18. An apparatus for enhancing a transient edge of a video signal, as set forth in claim 17, wherein said output signal selecting circuit includes:

a first point detector for logically combining the transient edge detection signal from said transient edge detecting means to detect a first select point of the interpolation interval length information and outputting a first resultant interpolation interval length information select point signal;

a second point detector for logically combining the n clocks delayed transient edge detection signal from said transient edge detection signal delay circuit to detect a second select point of the interpolation interval length information and outputting a second resultant interpolation interval length information select point signal;

a counting controller for controlling a counting operation in response to the first and second interpolation interval length information select point signals from said first and second point detectors;

a clock controller for applying a clock in response to the first and second interpolation interval length information select point signals from said first and second point detectors;

a second counter for up or down counting the clock from said clock controller under the control of said counting controller and outputting a resultant interpolation interval length information select control signal;

a multiplexer for selecting the n clocks delayed one of the output signals from said the first to fourth bit memories as the interpolation interval length information in response to the interpolation interval length information select control signal from said second counter and outputting the selected interpolation interval length information as high order addresses to said first and second ROMs; and a third counter for performing a counting operation in the interpolation interval of the transient edge and outputting the counted value as low order addresses to said first and second ROMs.

19. An, apparatus for enhancing a transient edge of a video signal, as set forth in claim 18, wherein said first point detector includes: a fifth bit memory for storing the transient edge detection signal from said transient edge detecting means; a third inverter gate for inverting an output signal from said fifth bit memory; and a third AND gate for ANDing an output signal from said third inverter gate and the transient edge detection signal from said transient edge detecting means and outputting the ANDed signal as the first interpolation interval length information select point signal.

20. An apparatus for enhancing a transient edge of a video signal, as set forth in claim 18, wherein said second point detector includes: a fifth bit memory for storing the n clocks delayed transient edge detection signal from said transient edge detection signal delay circuit; a third inverter gate for inverting an output signal from said fifth bit memory; and a third AND gate for ANDing an output signal from said third inverter and the n clocks delayed transient edge detection signal from said transient edge detection signal delay circuit and outputting the ANDed signal as the second interpolation interval length information select point signal.

21. An apparatus for enhancing a transient edge of a video signal, as set forth in claim 18, wherein said counting controller includes:

a RS flip-flop for controlling the up or down counting of said second counter in response to the interpolation interval length information select point signals from said first and second point detectors.

22. An apparatus for enhancing a transient edge of a video signal, as set forth in claim 18, wherein said clock controller includes:

an exclusive OR gate for exclusive-ORing the interpolation interval length information select point signal from the first and second point detectors and outputting the exclusive-ORed signal as the clock to said second counter; and a third AND gate for controlling the output from said exclusive OR gate.

23. An apparatus for enhancing a transient edge of a video signal, as set forth in claim 5, wherein said mixing means includes:

a multiplexer for selecting appropriate video signals in a non-transient edge interval, the interpolation interval and the replacement interval, respectively, in response to the n clocks delayed transient edge divide signal from said transient edge divide signal delay circuit and the n clocks delayed transient edge detection signal from said transient edge detection signal delay circuit; and a sample memory for storing the video signal from said multiplexer and then outputting the stored video signal.

24. A method of enhancing a transient edge of an inputted video signal, comprising the steps of:

(a) first degree-differentiating said inputted video signal, detecting an absolute value of the first degree-differentiated inputted video signal to form a first degree-differentiated absolute value and detecting the transient edge of the inputted video signal in accordance with the first degree-differentiated absolute value;

(b) second degree-differentiating the first degree-differentiated absolute value to form a second degree-differentiated absolute value, third degree-differentiating the second degree-differentiated absolute value to form a third degree-differentiated absolute value and dividing the transient edge into interpolation and replacement intervals in accordance with the third degree-differentiated absolute value;

(c) outputting the inputted video signal directly in a non-transient edge interval in which the transient edge is not detected at the step (a);

(d) replacing start and end pixel values of the transient edge of the inputted video signal with start and end pixel values of the transient edge detected at the step (a) in the replacement interval of the transient edge divided at the step (b); and (e) interpolating a value which is obtained by weighting and averaging the start and end pixel values of the transient edge detected at the step (a) into the transient edge of the inputted video signal in the interpolation interval of the transient edge divided at the step (b).

* * * * *